US012436987B2

(12) United States Patent
Maan et al.

(10) Patent No.: US 12,436,987 B2
(45) Date of Patent: Oct. 7, 2025

(54) METHOD AND SYSTEM TO IDENTIFY OBJECTIVES FROM PATENT DOCUMENTS

(71) Applicant: GREYB RESEARCH PRIVATE LIMITED, Chandigarh (IN)

(72) Inventors: Mahesh Maan, Mohali (IN); Shikhar Verma, Mohali (IN)

(73) Assignee: GREYB RESEARCH PRIVATE LIMITED, Chandigarh (IN)

( * ) Notice: Subject to any disclaimer, the term of this patent is extended or adjusted under 35 U.S.C. 154(b) by 146 days.

(21) Appl. No.: 17/738,034

(22) Filed: May 6, 2022

(65) Prior Publication Data

US 2023/0161800 A1 May 25, 2023

(30) Foreign Application Priority Data

Nov. 24, 2021 (IN) .............................. 202111054161

(51) Int. Cl.
G06F 16/353 (2025.01)
G06F 17/18 (2006.01)
G06N 20/00 (2019.01)

(52) U.S. Cl.
CPC ............ *G06F 16/353* (2019.01); *G06F 17/18* (2013.01); *G06N 20/00* (2019.01)

(58) Field of Classification Search
None
See application file for complete search history.

(56) References Cited

U.S. PATENT DOCUMENTS

| 10,210,218 B2* | 2/2019 | Crosby ................. G06F 16/332 |
| 2010/0257141 A1* | 10/2010 | Monet ..................... G06F 16/93 707/665 |
| 2019/0340250 A1* | 11/2019 | Rakshit ................. G06F 40/295 |

* cited by examiner

*Primary Examiner* — Thu N Nguyen
(74) *Attorney, Agent, or Firm* — Kendal M. Sheets (57) ABSTRACT

A method and a system for identifying an objective from documents is disclosed. In some embodiment, the method includes determining a correlation of each of a plurality of keywords extracted from a set of documents with respect to each class within a set of predefined classes. The method further includes determining a first set of keywords from the plurality of keywords. The method further includes identifying a set of data samples comprising a first plurality of sentences and a second plurality of sentences. The method further includes computing a statistical significance value of each keyword in the first set of keywords with respect to the first plurality of sentences. The method further includes generating a first set of features by discarding at least one keyword from the first set of keywords. The method further includes training a machine learning model to identify an objective of a document.

19 Claims, 9 Drawing Sheets

METHOD AND SYSTEM TO IDENTIFY OBJECTIVES FROM PATENT DOCUMENTS

TECHNICAL FIELD

This disclosure relates generally to processing documents, and more particularly to methods and systems to identify objectives from patent documents.

BACKGROUND

A patent document, such as a granted patent or a patent application, describes the technical details of an invention. Most invention are aimed at solving one or more practical problems and a typical patent document contains a description of these problems. The technical details of a patent document often become much easier to understand when a reader has developed a clear understanding of the problem being targeted by the invention. Many readers of patent documents, therefore, prefer to locate and read the problem description within a patent document before delving into the technical details of the invention. Such problem descriptions are often found in the background section of the patents. In many patent documents, however, the problem description is present in the 'detailed description' section of the patent document. The fact that most patent documents are lengthy, and complex makes it difficult and frustrating for readers to find the problem descriptions by manually skimming the patent document.

Therefore, there is a need for techniques for facilitating identification of problem descriptions in patent documents. Traditionally, development of such identification techniques falls under the fields of natural language processing and machine learning, where a machine learning model can be trained to identify a 'key description' within a document's text. In a typical setting, a machine learning model trained in a supervised manner as a binary classifier, classifies each segment of the document (e.g., a sentence or a paragraph) as either a 'positive segment' or a 'negative segment,' where positive segments can be considered to be qualifying as key description. Such machine learning models, however, typically require a large amount of labelled data for training. Additionally, they require a lot of computational resources during training and while doing the actual classification (inference stage). Such models also typically have a large number of parameters and the calculations involved during their inference steps require considerable time. Use of typical text classification models, therefore, results in high computation cost and latency. This makes it difficult to use such models for processing very large number (e.g., hundreds of millions) of documents.

Similar situations arise in other types of documents such as articles, research papers, legal contracts, etc., where an objective of the document needs to be identified. In such documents, objective may be described under specific sections such as abstract, background, and introduction with keywords like a 'proposed solution' or 'key takeaway.'

SUMMARY

In one embodiment, a method of identifying an objective from documents is disclosed. In one embodiment, the method may include determining a correlation of each of a plurality of keywords extracted from a set of documents with respect to each class within a set of predefined classes. The method may further include determining a first set of keywords from the plurality of keywords where the correlation for each of the first set of keywords is below a predefined correlation threshold. The method may further include identifying a set of data samples comprising a first plurality of sentences oriented towards a set of objectives and a second plurality of sentences disaffiliated from the set of objectives. The method may further include computing a statistical significance value of each keyword in the first set of keywords with respect to the first plurality of sentences. The method may further include generating a first set of features by discarding at least one keyword from the first set of keywords. It should be noted that the statistical significance value for each of the at least one keyword is above a predefined statistical threshold. The method may further include training a machine learning model to identify an objective of a document, based on the first set of features and the first plurality of sentences.

In another embodiment, a system for identifying an objective from documents is disclosed. The system includes a processor and a memory communicatively coupled to the processor, wherein the memory stores processor instructions, which, on execution, causes the processor to determine a correlation of each of a plurality of keywords extracted from a set of documents with respect to each class within a set of predefined classes. The processor instructions further cause the processor to determine a first set of keywords from the plurality of keywords. It should be noted that, the correlation for each of the first set of keywords is below a predefined correlation threshold. The processor instructions further cause the processor to identify a set of data samples comprising a first plurality of sentences oriented towards a set of objectives and a second plurality of sentences disaffiliated from the set of objectives. The processor instructions further cause the processor to compute a statistical significance value of each keyword in the first set of keywords with respect to the first plurality of sentences. The processor instructions further cause the processor to generate a first set of features by discarding at least one keyword from the first set of keywords. It should be noted that, the statistical significance value for each of the at least one keyword is above a predefined statistical threshold. The processor instructions further cause the processor to train a machine learning model to identify an objective of a document, based on the first set of features and the first plurality of sentences.

In yet another embodiment, a non-transitory computer-readable medium storing computer-executable instruction for identifying an objective from documents is disclosed. The stored instructions, when executed by a processor, may cause the processor to perform operations including determining a correlation of each of a plurality of keywords extracted from a set of documents with respect to each class within a set of predefined classes. The operations may further include determining a first set of keywords from the plurality of keywords. It should be noted that, the correlation for each of the first set of keywords is below a predefined correlation threshold. The operations may further include identifying a set of data samples comprising a first plurality of sentences oriented towards a set of objectives and a second plurality of sentences disaffiliated from the set of objectives. The operations may further include computing a statistical significance value of each keyword in the first set of keywords with respect to the first plurality of sentences. The operations may further include generating a first set of features by discarding at least one keyword from the first set of keywords. It should be noted that, the statistical significance value for each of the at least one keyword is above a predefined statistical threshold. The operations may further include training a machine learning model to identify an objective of a document, based on the first set of features and the first plurality of sentences.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
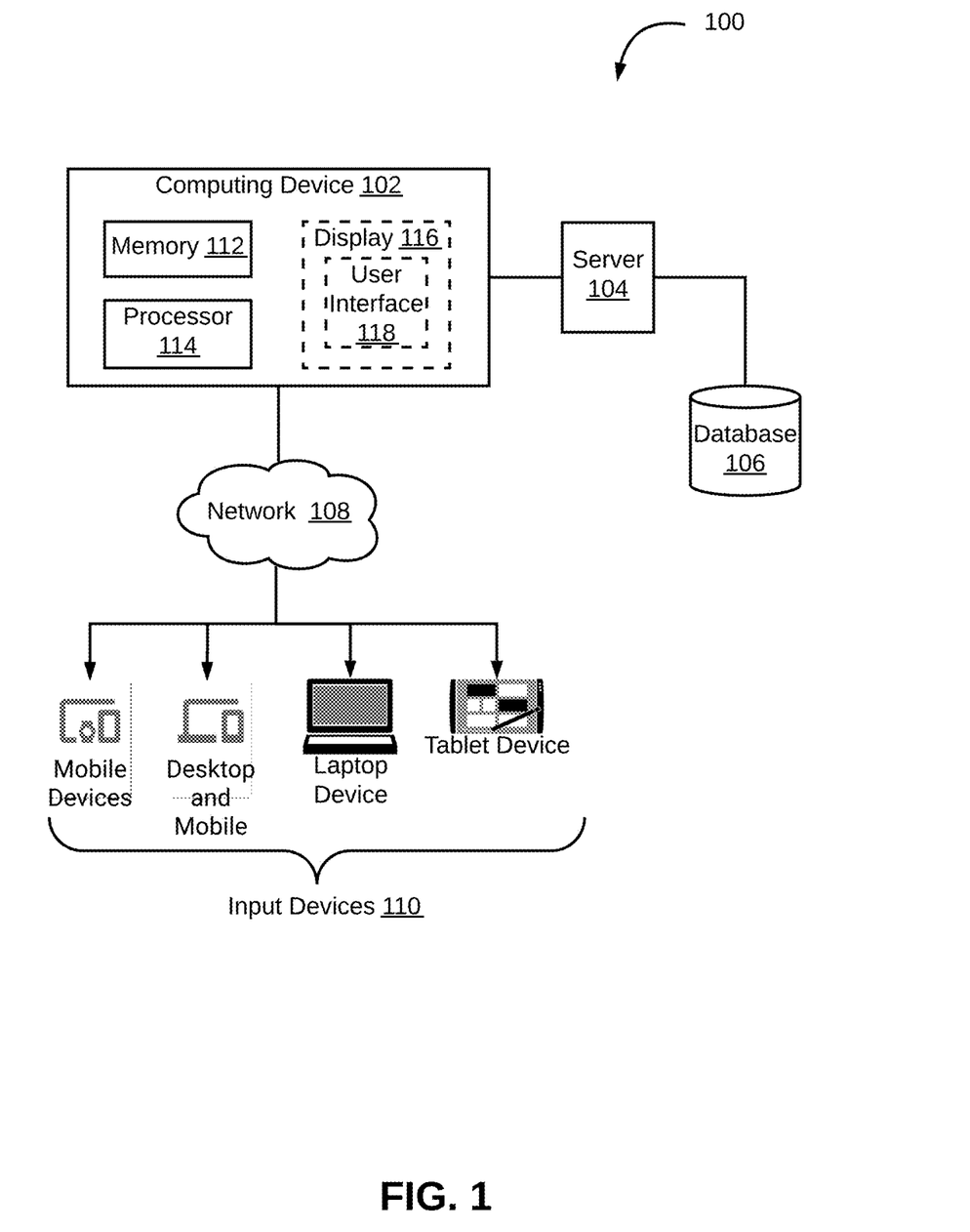
FIG. 1 is a block diagram of a system for identifying objectives from documents, in accordance with an embodiment.

In one embodiment, a system 100 for identifying objectives from documents is illustrated in the FIG. 1, in accordance with an embodiment. By way of an example, the system 100 may be used to identify a problem addressed in a patent document. In other words, a document may be a patent document (for example, a patent application or a granted patent) and the objective may be a problem addressed (also referred as a problem statement) in the patent document. The system 100 may include a computing device 102 that has processing capability to identify an objective from a document. Examples of the computing device 102 may include, but are not limited to, a server, a desktop, a laptop, a notebook, a netbook, a tablet, a smartphone, a mobile phone, an application server, or the like.

The document may be received by the computing device 102 from a plurality of input devices 110. Examples of the plurality of input devices 110 may include, but are not limited to a desktop, a laptop, a notebook, a netbook, a tablet, a smartphone, a remote server, a mobile phone, or another computing system/device. The plurality of input devices 110 may be communicatively coupled to the computing device 102, via a network 108. The network 108 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

As will be described in greater detail in conjunction with FIG. 2 to FIG. 7, in order to identify the objective from the document, the computing device 102 may extract a set of documents from a server 104, which is further communicatively coupled to a database 106. Thereafter, the computing device 102 may identify a plurality of keywords extracted from the set of documents. The computing device 102 may then use the identified plurality of keywords to determine a first set of features. The first set of features may further be used by the computing device 102 to train a machine learning model to identify objective from documents.

In order to perform the above discussed functionalities, the computing device 102 may include a memory 112 and a processor 114. The memory 112 may store instructions that, when executed by the processor 114, cause the processor 114 to identify the objective from the document. The memory 112 may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM). The memory 112 may also store various data (e.g., document text data, objective data, keywords data, features data, machine learning data, tuples data, predefined action data, feedback data, etc.) that may be captured, processed, and/or required by the system 100.

The computing device 102 may include a display 116 that may further include a user interface 118. A user or an administrator may interact with the computing device 102 and vice versa through the display 116. By way of an example, the display 116 may be used to display results of analysis performed by the computing device 102, to the user. By way of another example, the user interface 118 may be used by the user to provide inputs to the computing device 102.

Figure 2:
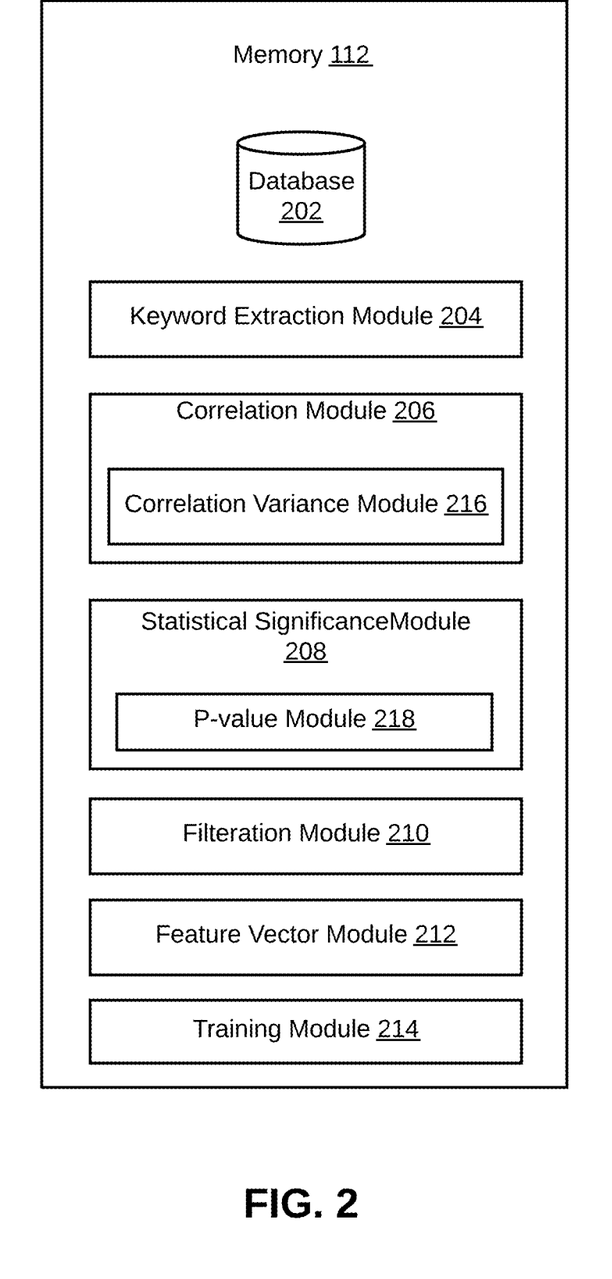
FIG. 2 illustrates a block diagram of various modules within a memory of a computing device configured to identify an objective from a document, in accordance with an embodiment.

Referring now to FIG. 2, a functional block diagram of the memory 112 within the computing device 102 configured to identify an objective from a document is illustrated, in accordance with an embodiment. The memory 112 may include modules that may perform various functions so as to identify the objective from the document. As discussed above, when the document is a patent document, the objective may be a problem statement. The memory 112 may include a database 202, a keyword extraction module 204, a correlation module 206 that may further include a correlation variance module 216, a statistical significance module 208 that may further include a P-value module 218, a filtration module 210, a feature vector module 212, and a training module 214. As will be appreciated by those skilled in the art, all such aforementioned modules 202-218 may be represented as a single module or a combination of different modules. Moreover, as will be appreciated by those skilled in the art, each of the modules 202-218 may reside, in whole or in parts, on one device or multiple devices in communication with each other.

As explained in conjunction to FIG. 1, the computing device 102 may extract a set of documents from the server 104 connected to the database 106. Each of the set of documents extracted from the server 104 may include a text description. Further, the extracted set of documents may be stored in the database 202 within the memory 112. Post extraction, the set of documents may be directly provided to the keyword extraction module 204.

The keyword extraction module 204 may then extract a plurality of keywords from the set of documents. In an embodiment, the plurality of keywords may be extracted through tokenization. Tokenization may be defined as a process of breaking down text into keywords (also referred to as tokens). The extracted plurality of keywords may then be provided to the correlation module 206, which may determine a correlation for each of the plurality of keywords with respect to each class within a set of predefined classes. The set of predefined classes may correspond to predefined categories associated with a particular domain. In an embodiment, each of the set of predefined classes may be determined based on the set of documents.

By way of an example, suppose the set of documents may correspond to a set of patent documents. The keyword extraction module 204 may extract a plurality of keywords from the set of patent documents. The extracted plurality of keywords may then be provided to correlation module 206 in order to determine the correlation for each plurality of keyword with respect to each class within a set of predefined patent classes. Examples of the set of predefined patent classes may include, but are not limited to International Patent Classification (IPC), Cooperative Patent Classification (CPC), Locarno Classification (LOC) and United State Patent Classification (USPC).

In an embodiment, the correlation for each of the plurality of keywords may be determined by computing a correlation variance. To this end, the correlation module 206 may further include a correlation variance module 216. The correlation variance module 216 may be configured to determine a correlation variance for each of the plurality of keyword with respect to the set of predefined classes. The method of determining the correlation variance for each of the plurality of keywords is explained in detail in conjunction to FIG. 4. Once the correlation variance for each of the plurality of keywords is determined, the filtration module 210 may filter out one or more keywords from the plurality of keywords based on a predefined variance threshold. For each of the one or more keywords, the correlation variance is above the predefined correlation threshold. Once the one or more keywords are filtered from the plurality of keywords, remaining keywords may form a first set of keywords.

In an embodiment, a set of data samples may be identified. The set of data sample may include a first plurality of sentences affiliated (or oriented) with the set of objectives and a second plurality of sentences disaffiliated from the set of objectives. The identification of the set of data samples may be performed manually. Further, the identified set of data samples may then be fed into the database 202. By way of an example, when the documents are patent documents, the first plurality of sentences may include problem statements and the second plurality of sentences may include any statement except problem statements.

Once the first set of keywords and the first plurality of sentences are determined, the keyword extraction module 204 may be configured to extract a subset of keywords. The subset of keywords may be extracted from the first plurality of sentences based on the first set of keywords. Moreover, the subset of keywords extracted may be a subset of the first set of keywords. As will be appreciated, the subset of keywords may correspond to keywords that are more relevant from the first set of keywords.

By way of an example, suppose the first set of keywords determined from the patent document may include words such as 'however', 'therefore', 'fail', 'conventional', 'existing', 'drawback', 'inefficient', leads to', 'problem', 'need', 'wastage', 'difficult', 'lack', 'limitations', etc. In addition, examples of the first set of sentences oriented towards the set of objective (i.e., the problem statement) may include sentences like, "these systems fail to take into account different phrasings, terminology, sentence structure, syntax, and speech patterns", "this limits the ability of such systems to properly respond to user input", "existing automated customer service systems are deficient in a number of ways and fail to meet the needs of companies that utilize them", "a need exists for an artificial intelligence system that is able to interact with individuals intelligently and respond to the individuals with intelligent, responsive results". Further, based on the first set of keywords, the subset of keywords may be extracted from the first plurality of sentences. In present example, the subset of keywords may include words like existing, limits, fail, need, etc.

The subset of keywords, the first set of keywords, and the first plurality of sentences may then be provided to the statistical significance module 208. The statistical significance module 208 may be configured to compute a statistical significance value of each keyword in the first set of keywords with respect to the first plurality of sentences. In particular, the statistical significance value may be computed for each keyword present in the subset of keywords of the first set of keywords. The statistical significance value, for example, may be P-value. In this case, the statistical significance module 208 may further include the P-value module 218 that may determine the P-value for each keyword, i.e., each of the subset of keywords of the first set of keywords with respect to the first plurality of sentences. Once the P-value module 218 has determined P-value for each of the subset of keywords, the filtration module 210 may filter out one or more keywords from the subset of keywords based on a predefined P-value threshold. For each of the one or more keywords, the P-value is above the predefined P-value threshold.

Once the one or more keywords are filtered, the remaining keywords may form a first set of features. In an embodiment, the first set of features may include, but is not limited to, hundred to thousand words. Each word present in the first set of features may be arranged in an alphabetical order. Example of the first set of features may include words like 'ability', 'above', 'able', . . . , 'worse', 'would', 'yet', and so forth. The method of identifying the first set of features is explained in detail in conjunction with FIG. 5.

The feature vector module 212 may be configured to receive the first set of features. The feature vector module 212 may then characterize each feature in the first set of features based on their numeric or symbolic characteristics for easy analysis of each feature in the first set of features. The feature vector module 212 may further provide the first set of features to a training module 214. The training module

214, may employ a machine learning model which may be trained based on the first set of features and the set of data samples that includes the first plurality of sentences and the second plurality of sentences. By way of an example, the machine learning model may correspond with a machine learning model 804 of FIG. 8. The machine learning model may be trained to identify the objective of any document. By way of example, as mentioned above, when the document is the patent document, then the objective may correspond to the problem statement. By way of another example, when the document is an article, then the objective may correspond to a topic of concern discussed in the article. The process of training the machine learning model is explained in detail in conjunction with FIG. 6 and FIG. 7.

Figure 3:
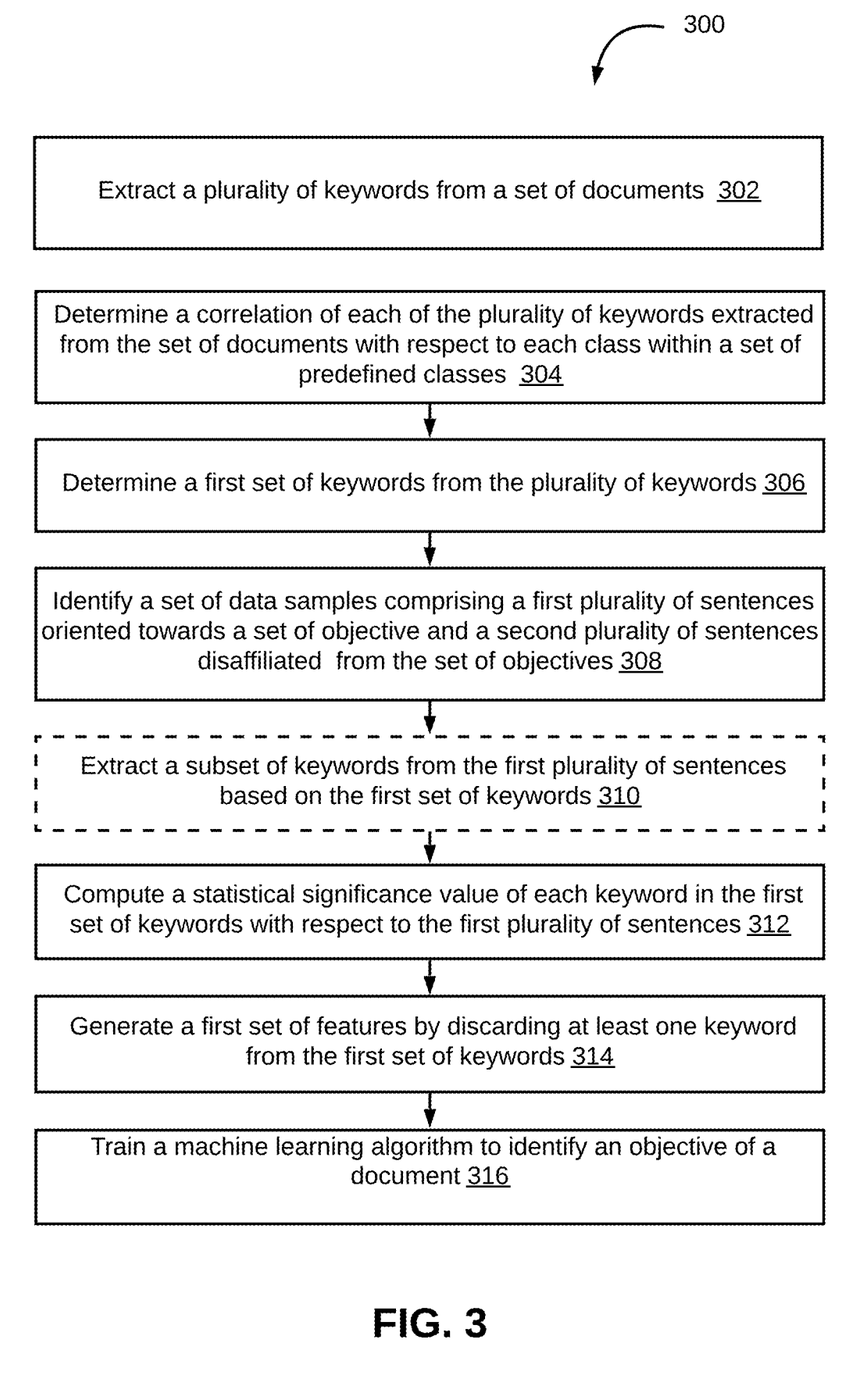
FIG. 3 illustrates a flowchart of a method for identifying objectives from documents, in accordance with an embodiment.

Referring now to FIG. 3, a flowchart 300 of a method for identifying objectives from documents is illustrated, in accordance with an embodiment. In some embodiments, the computing device 102 may identify the objectives from the documents.

At step 302, a plurality of keywords may be extracted from a set of documents. The plurality of keywords may be extracted by breaking text present in each of the set of documents in keywords (also referred as tokens) using the process called tokenization. Thereafter, at step 304, the correlation for each of the plurality of keywords may be determined with respect to each class within a set of predefined classes. The set of predefined classes may correspond with predefined categories in a particular domain. The domain may correspond to any technology, trend, technique, etc. For example, the domain for the documents may include, but are not limited to business, educational, patent, thesis, journals, articles, etc. By way of an example, when the domain for the document is business, the predefined categories may be legal, finance, persuasive, negative, agreement, etc. The predefined categories (i.e., legal, finance, persuasive, negative, agreement, etc.,) may correspond to the set of predefined classes related to business domain. Further, the correlation may be identified for each keyword in the business domain with respect to the set of predefined business classes. By way of another example, when the domain for the document is patent, the set of predefined classes may include IPC classes, CPC classes, USPC classes, Locarno Classes, etc. Further, the correlation may be identified for each keyword in the patent domain with respect to the set of predefined patent class.

At step 306, a first set of keywords may be identified from the plurality of keywords. In an embodiment, the correlation for each of the first set of keywords may be below a predefined correlation threshold. In an embodiment, the correlation of a keyword may be the correlation variance of the keyword with respect to each class within the set of predefined classes. In this case, the predefined correlation threshold may be the predefined correlation variance threshold. Thus, the predefined correlation variance threshold may be used to filter out one or more keywords from the first set of keywords. For each of the one or more keywords, the correlation variance is above the predefined correlation variance threshold. Once the one or more keywords are filtered, the remaining keywords may form the first set of keywords. By way of an example, in patent domain, the correlation variance may be determined for each keyword extracted with respect to the set of predefined patent classes to obtain a first set of keywords. The set of predefined patent classes may include, but is not limited to IPC classes, CPC classes, USPC classes and Locarno classes. This is further explained in detail in conjunction with FIG. 4.

Once the first set of keywords are determined, at step 308, the set of data samples may be identified. The set of data samples may include a first plurality of sentences affiliated with a set of objectives and a second plurality of sentences disaffiliated from the set of objectives. The set of data samples and segregation of the first plurality of sentences and the second plurality of sentences may be obtained by manual labeling. By way of an example, in patent domain, a set of data sample may include a first plurality of sentences affiliated with a set of objectives. The set of objectives for patent domain may correspond to the problem statement disclosed in a patent. The second plurality of sentences may include a second plurality of sentences disaffiliated from the problem statement. Moreover, the first plurality of sentences and the second plurality of sentences may be segregated by manually marking each sentence that may describe the problem statement (i.e., the first plurality of sentences) of the patent document with a numerical value "1". In addition, each of the second plurality of sentences that may not describe the problem statement may be manually marked with a numerical value "0".

Once the first set of keywords and the first plurality of sentences are identified, at step 310, a subset of keywords may be extracted from the first plurality of sentences. The subset of keywords may be extracted based on the first set of keywords. In addition, the subset of keywords extracted may correspond to a subset of the first set of keywords. Upon extracting the subset of keywords, at step 312, a statistical significance value of each keyword in the first set of keywords may be computed with respect to the first plurality of sentences. In an embodiment, the statistical significance value may be computed for each keyword in the subset of keywords with respect to the set of objectives. Moreover, the statistical significance value may correspond to a P-value. The P-value may correspond to a statistical measure used for representing probability of occurrence of each of the subset of keywords in an objective statement.

Further, at step 314, a first set of features may be generated based on a predefined statistical threshold. In order to generate the first set of features, one or more keywords may be filtered from the first set of keywords. In other words, in order to generate the first set of features, the one or more keywords may be discarded from the subset of keywords. Each of the one or more keyword filtered may have statistical significance value above the predefined statistical threshold. Once the one or more keywords are filtered out, remaining set of keywords may form the first set of features. The generation of the first set of features based on P values is explained in detail in conjunction with FIG. 5.

Thereafter, at step 316, a machine learning model may be trained based on the first set of features and the first plurality of sentences. The first plurality of sentences may correspond to sentences that may be affiliated with the set of objectives. The trained machine learning model may then be used to identify an objective from a document provided as an input by a user. In an embodiment, the identification of the objective from the document may correspond to a method of identifying a problem statement disclosed in a patent document. In reference to FIG. 1, in order to identify the objective from the document, the computing device 102 may deploy the trained machine learning model. Moreover, the document may be provided as the input to the computing device 102, by the user via one of the plurality of input devices 110. The process of training the machine learning model is explained in detail in conjunction with FIG. 6 and FIG. 7.

Figure 4:
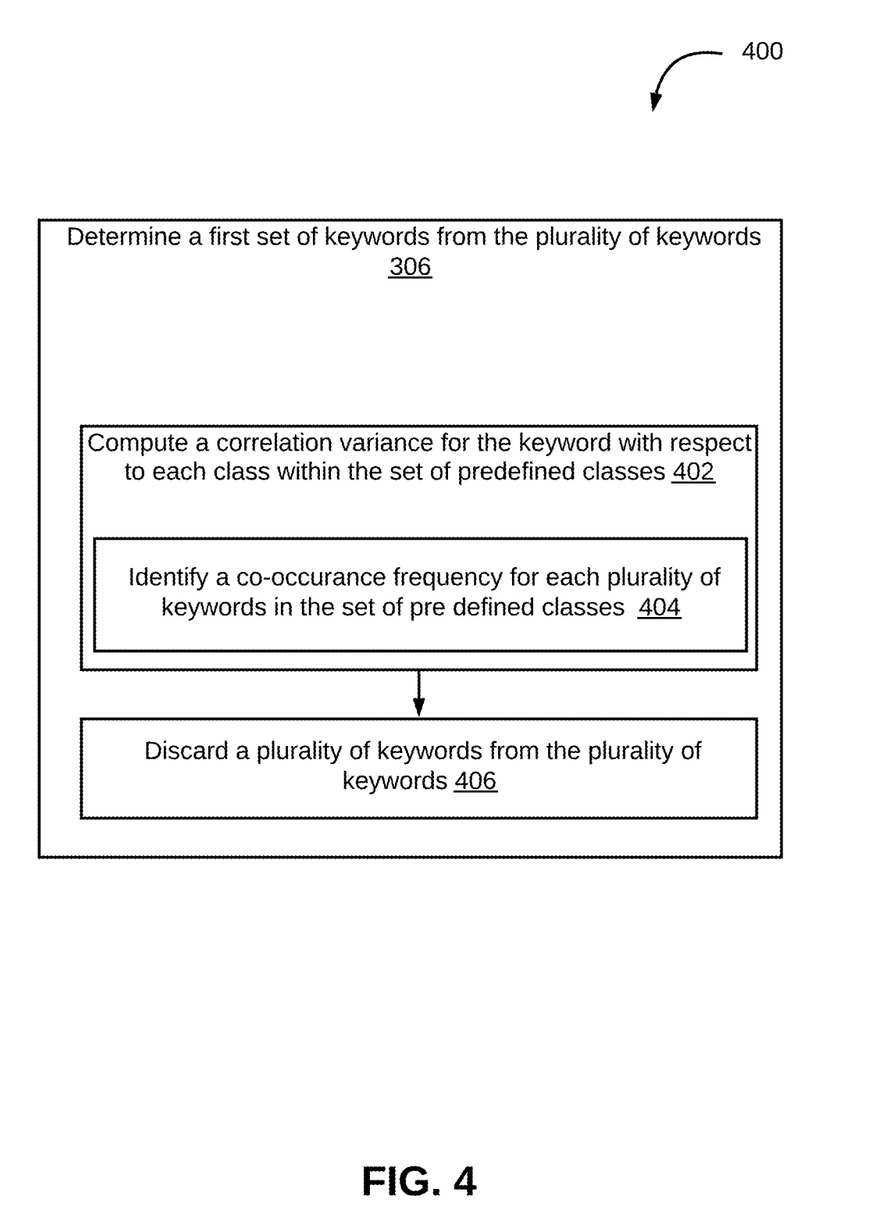
FIG. 4 illustrates a flowchart of a method for identifying a first set of keywords from a plurality of keywords based on the associated correlation with respect to a set of predefined classes, in accordance with an embodiment.

Referring now to FIG. 4, a flowchart 400 of a method for identifying a first set of keywords from a plurality of keywords based on the associated correlation with respect to a set of predefined classes is illustrated, in accordance with an embodiment. In reference to FIG. 3, in order to determine the first set of keywords from the plurality of keywords as mentioned in step 306, at step 402, a correlation variance may be computed for each of the plurality of keywords with respect to each of the set of predefined classes. It should be noted that, the plurality of keywords may be extracted from the set of documents. In reference to FIG. 3, the correlation variance may correspond to the correlation determined for each of the plurality of keywords. Further, in order to compute the correlation variance, each of the plurality of keywords and the set of predefined classes may be arranged in a form of matrix. In an embodiment, the matrix may include a plurality of matrix rows and a plurality of matrix columns. Each of the plurality of matrix rows may include one of the plurality of keywords. In addition, each of the plurality of matrix columns may include one of the set of predefined classes.

By way of an example, for patent domain, the plurality of matrix may include the plurality of keywords extracted from the patent document. Additionally, the plurality of matrix columns may include the set of predefined patent classes. Table 1 below represents arrangement of the plurality of keywords as the plurality of matrix rows and the set of predefined patent classes as the plurality of matrix column.

TABLE 1

|  |  | Predefined Patent Class | | |
|---|---|---|---|---|
|  |  | $C_1$ | $C_2$ | $C_3$ |
| Plurality of | $W_1$ | 3 | 3 | 3 |
| keywords | $W_2$ | 0 | 3 | 0 |
| extracted | $W_3$ | 1 | 2 | 0 |

As depicted via 'Table 1' above, the plurality of keywords extracted from patent are represented in the plurality of matrix rows as '$W_j$'. It should be noted that, value of "j" may be equals to '1', '2', '3', . . . , and so on. In addition, the set of predefined patent classes associated with the patent document are represented in the plurality of matrix columns as '$C_k$'. It should be noted that, value of "k" may be equals to '1', '2', '3', . . . , and so on. Examples of the set of predefined patent classes may include, but are not limited to IPC, CPC, LOC, and USPC. In an embodiment, each element, i.e., '$W_{ij}$', present in row 'j' and column 'k' of the matrix may represent number of times a class from the set of predefined classes has appeared in the patent document that includes a keyword from the plurality of keywords. By way of an example, an element '$W_{11}$' may represent that a class '$C_1$' that includes a keyword '$W_1$' has appeared '3' times in the patent document.

Further, in order to compute the correlation variance, at step 404, a co-occurrence frequency may be determined for each of the plurality of keyword with respect to the set of predefined classes. As explained in step 402, the co-occurrence frequency for each of the plurality of keyword may be determined based on the number of times the class from the set of predefined classes has appeared in the patent document that includes the keyword from the plurality of keywords. In other words, the co-occurrence frequency of each of the plurality of keywords with respect to the set of predefined classes may be depicted via '$W_{ij}$'.

Further, the co-occurrence frequency associated with each of the plurality of keywords may be normalized to bring each of the co-occurrence frequency at a similar scale. In order to normalize the co-occurrence frequency associated with each of the plurality of keywords, each co-occurrence frequency present in one of the plurality of matrix rows may be divided by sum of all the co-occurrence frequency present in that matrix row. Table 2 below represents normalized form of data (i.e., the co-occurrence frequency) present in the matrix.

TABLE 2

|  |  | Predefined Patent Class | | | |
|---|---|---|---|---|---|
|  |  | $C_1$ | $C_2$ | $C_3$ | Sum |
| Plurality of | $W_1$ | 0.33 | 0.33 | 0.33 | 9 |
| keywords | $W_2$ | 0.00 | 1.00 | 0.00 | 3 |
| extracted | $W_3$ | 0.33 | 0.66 | 0.00 | 3 |

By way of example, in order to normalize each co-occurrence frequency associated with keyword sum '$W_1$', of the co-occurrence frequency of each element present in first row, i.e., '$W_{11}$', and '$W_{12}$', and '$W_{13}$' may be calculated. In present example, the sum of each of the co-occurrence frequency of the keyword '$W_1$' may be '9'. Further, each element may present in first row, i.e., '$W_{11}$', '$W_{12}$', and '$W_{13}$' may be divided by '9', in order to normalize the co-occurrence frequency determined for the keyword '$W_1$' corresponding to the classes '$C_1$', '$C_2$', and '$C_3$'.

Further, based on the co-occurrence frequency, the correlation variance of each of the plurality of keywords may be determined. In an embodiment, the correlation variance may be defined as a measure of class-correlation of each of the plurality of keywords. In other words, the correlation variance may help to determine polarity of each of the plurality of keywords towards at least one of the set of predefined classes. Table 3 below represents the correlation variance (depicted as 'Var' calculated for each of the plurality of keywords with respect to each class within the set of predefined classes.

TABLE 3

|  |  | Predefined Patent Class | | | | |
|---|---|---|---|---|---|---|
|  |  | $C_1$ | $C_2$ | $C_3$ | Sum | Var |
| Plurality of keywords | $W_1$ | 0.33 | 0.33 | 0.33 | 9 | 0.00 |
| extracted | $W_2$ | 0.00 | 1.00 | 0.00 | 3 | 0.22 |
|  | $W_3$ | 0.33 | 0.66 | 0.00 | 3 | 0.07 |

As depicted via 'table 3' above, the correlation variance of keyword is determined to be '0.00'. This means that the keyword '$W_1$' has no polarity from the plurality of keywords depicted in the 'table 3' and is technologically neutral. However, the correlation variance of keyword '$W_3$' is determined to be '0.22'. This means that the keyword '$W_2$' has high polarity from the plurality of keywords depicted in the 'table 3'. and is technologically significant.

Once the correlation variance is determined, at step 406, a first set of keywords may be identified. The first set of keywords may be identified based on the correlation variance of each keyword from the plurality of keywords and the predefined correlation variance threshold. In an embodiment, the predefined correlation variance threshold may also be referred as the predefined correlation threshold. Moreover, the predefined correlation variance threshold may correspond to a maximum threshold value on correlation variance and may be arbitrarily or empirically chosen. For example, the threshold can be chosen in such a way that a fixed number of keywords (say, for example, in the range 1,000 to 10,000) have correlation variance value below the threshold. An alternative way of deciding this threshold could be through manually analysing the correlation threshold values and selecting a threshold value above which the keywords are more likely to be associated with a subset of the categories. Thus, predefined correlation variance threshold may be used to filter out/discard one or more keyword from the plurality of keywords. In an embodiment, the correlation variance of each of the one or more keywords filtered out, is above the predefined correlation threshold. Once the one or more keywords are filtered out, the remaining keywords may form the first set of keywords.

Figure 5:
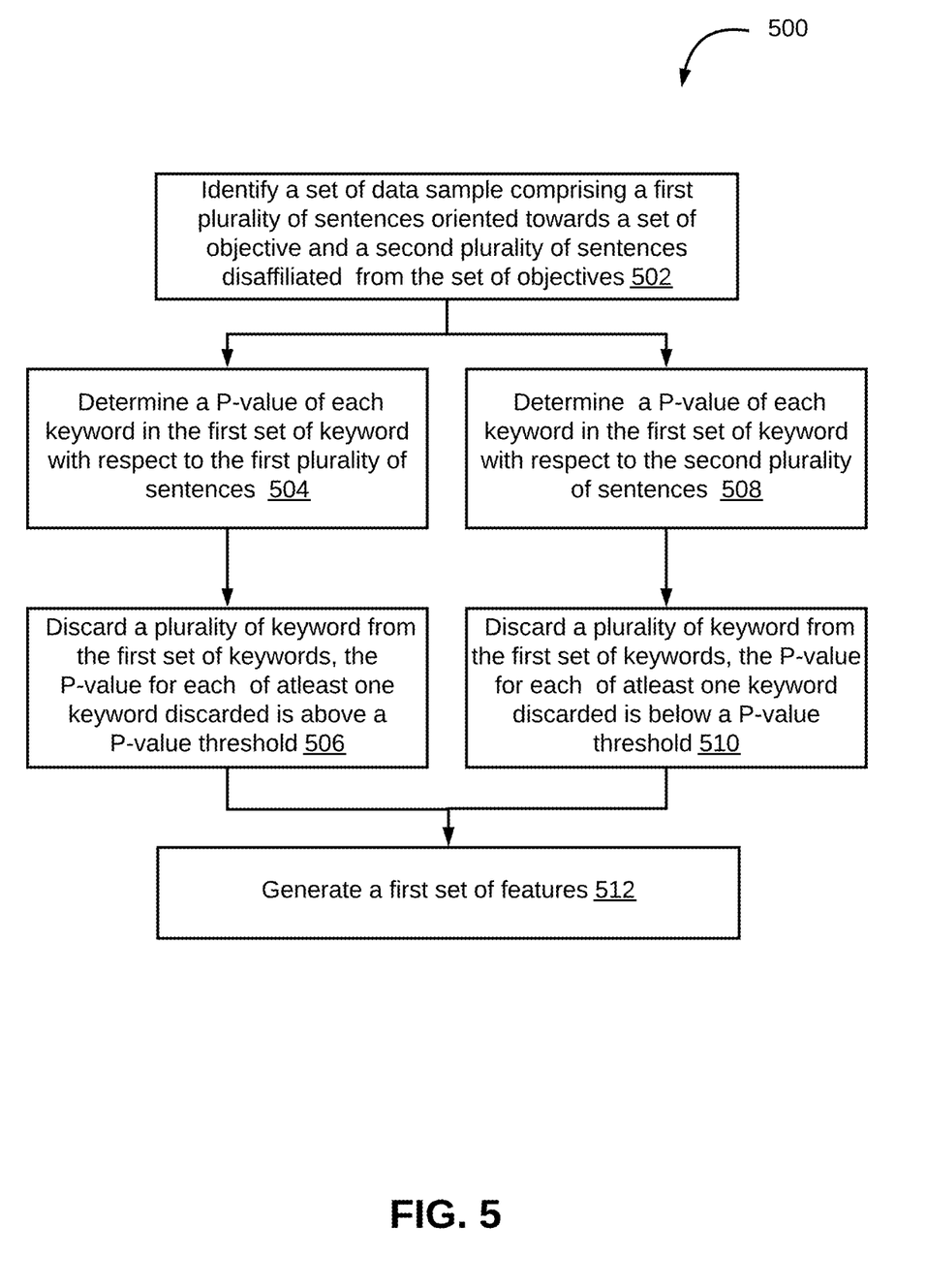
FIG. 5 illustrates a flowchart of a method for identifying a first set of features from the first set of keywords, in accordance with an embodiment.

Referring now to FIG. 5, a flowchart 500 of a method for identifying a first set of features from the first set of keywords is illustrated, in accordance with an embodiment. Initially at step 502, a set of data samples may be identified. The set of data samples may include a first plurality of sentences and a second plurality of sentences. In an embodiment, the first plurality of sentences may correspond to sentences that are affiliated with the set of objectives. In other words, the first plurality of sentences may be oriented towards the set of objectives. In addition, the second plurality of sentences may correspond to sentences that are disaffiliated from the set of objectives.

Further, at step 504, a P-value may be identified for each keyword in the first set of keywords with respect to the first plurality of sentences affiliated towards the set of objectives. The P-value may also be referred as the statistical significance value. In an embodiment, the first set of keywords may be determined from the plurality of keywords based on the predefined correlation threshold. Further, at step 506, one or more keyword from the first set of keywords may be discarded (or filtered out) based on a predefined P-value threshold. Further, the P-value of each of the one or more keywords discarded from the first set of keywords may be above than the predefined P-value threshold. In an embodiment, the predefined p-value threshold may also be referred as the predefined statistical threshold. Moreover, value of the predefined P-value threshold may be arbitrarily chosen.

At step 508, a P-value may be identified for each keyword in the first set of keywords with respect to the second plurality of sentences disaffiliated from the set of objectives. Once the p-value for each of the first set of keywords with respect to the second plurality of sentences is identified, then at step 510, one or more keywords may be discarded from the first set of keywords. In an embodiment, the one or more keywords may be discarded based on the predefined P-value threshold. Further, the P-value of the one or more keywords discarded may be below the predefined P-value threshold. Once the one or more keywords are discarded/filtered out, then at step 512, the first set of features may be generated. The first set of features may correspond to the remaining keywords from the first set of keywords.

Figure 6:
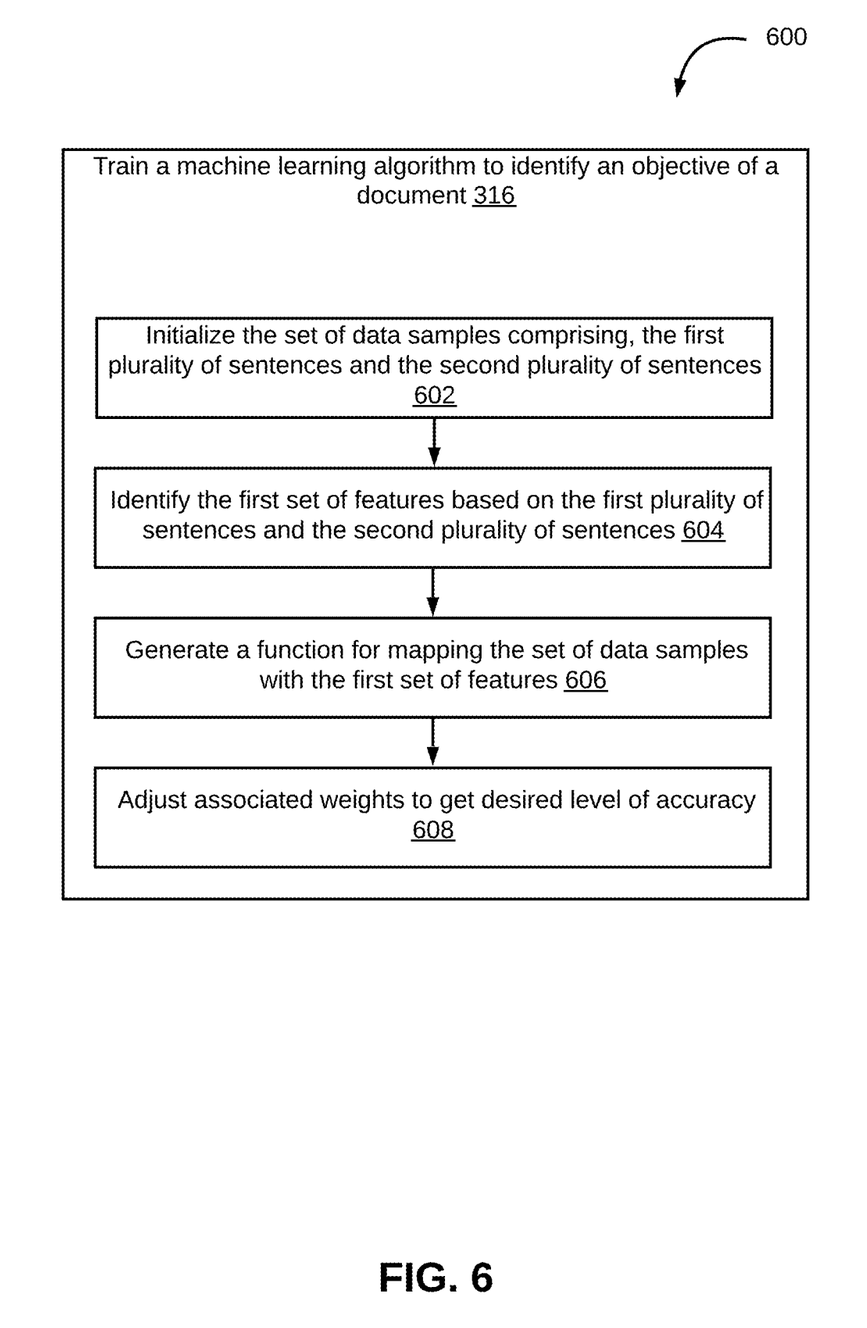
FIG. 6 illustrates a flowchart of a method of training a machine learning model, in accordance with an embodiment.

Referring to FIG. 6 a flowchart 600 of a method of training a machine learning model is illustrated, in accordance with an embodiment. As will be appreciated, in order to train the machine learning model, any machine learning algorithms may be utilized. Examples of machine learning algorithms utilized for training the machine learning model may include, but are not limited to, backpropagation (in case of neural networks), gradient descent, dynamic programming, and reinforcement learning. In reference to FIG. 3, in order to train the machine learning model as mentioned in step 316, at step 602, the set of data samples may be initialized. The first set of data samples may include the first plurality of sentences and the second plurality of sentences.

Once the set of data samples is initialized, at step 604, the first set of features may be identified. In an embodiment, the first set of features may be identified based on the first plurality of sentences and the second plurality of sentences. Further, at step 606, a function may be generated for mapping the set of data samples with the first set of features. Based on mapping of the set of data samples with the first set of features, associated weights may be generated. In an embodiment, the associated weights generated may correspond to a weight matrix. Thereafter, at step 608, in order to get desired level of accuracy, the generated associated weights may be adjusted. In other words, the generated associated weights may be adjusted iteratively during a training phase to increase accuracy of the machine learning model in order to predict correct results. A process of training the machine learning model is further explained in detail in conjunction with FIG. 7.

Figure 7:
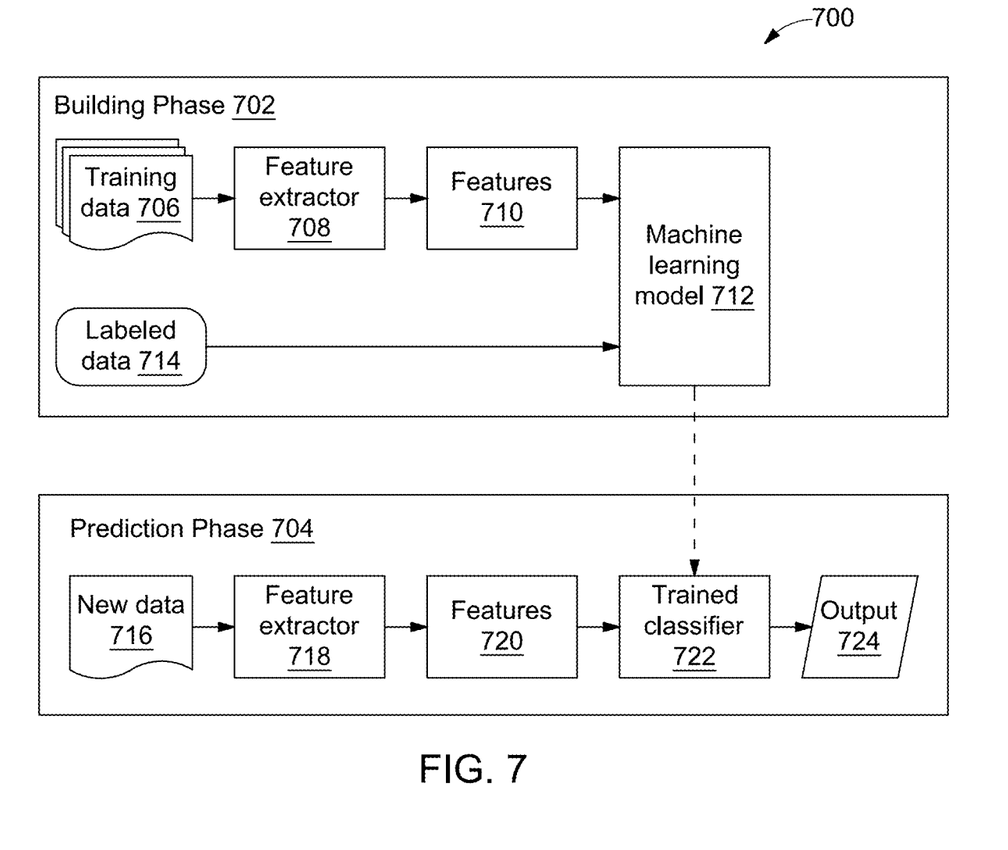
FIG. 7 illustrate a flow diagram depicting a process of training a machine learning model to identify objectives from documents, in accordance with an embodiment.

Referring to FIG. 7, a flow diagram 700 depicting a process of training a machine learning model 712 to identify objectives from documents is illustrated, in accordance with an embodiment. The machine learning model 712 may operate in two different phases i.e., a building phase 702 and a prediction phase 704. The building phase 702 may use a machine learning algorithm to train the machine learning model 712. Examples of machine learning algorithm utilized for training the machine meaning model 712 may include, but are not limited to, backpropagation (in case of neural networks), gradient descent, dynamic programming, and reinforcement learning. In addition, examples of machine learning model 712 may include, but are not limited to, logistic regression classifier, support vector machine, and artificial neural network. In order to train the machine learning model 712, a set of training data 706 may be required. The set of training data 706 may correspond to the set of documents. In reference to FIG. 1, the set of documents may be extracted from the server 104 connected with the database 106.

Once the set of documents are extracted, the feature extractor 708 may extract a set of keywords from the set of documents. The set of keywords may be extracted based on domain of each of the set of documents. The set of keywords may correspond to features 710. In order to train the machine learning model 712, the machine learning algorithm used by the machine learning model 712 may utilize the features 710 along with a labeled data 714. In reference to above FIG. 1-FIG. 6 the labeled data 714 may correspond to the set of sample data. The labeled data 714 may include manually extracted data. The manually extracted data may correspond to the first plurality of sentences and the second plurality of sentences. In an embodiment, the first plurality of sentences may be affiliated towards the set of objectives. In addition, the second plurality of sentences may be disaffiliated from the set of objectives.

Further, the machine learning model 712, may generate a set of features based on the features 710 and labeled data 714. In reference to above FIG. 1-FIG. 6, the set of features may correspond to the first set of features. In an embodiment, the set of features may be obtained based on the mapping of the features 710 with the labeled data 714. Moreover, the mapping of the features 710 with the labeled data 714 may be done based on the function generated for the mapping.

Once the machine learning model 712 is trained, at prediction phase 704, upon receiving a new data 716, a feature extractor 718 may extract features 720 from the new data 716. In an embodiment, the new data 716 may correspond to a new document. Thereafter, the extracted feature 720 may be provided to a trained classifier 722. In reference to FIG. 3, the trained classifier 722 may correspond to the trained machine learning model. The trained classifier 722 may use the first set of features, i.e., the features 710 for mapping with the extracted features 720. The mapping of the features 710 with the extracted features 720 may be done to identify an output 724. In an embodiment, the output 724 may correspond to the objective of the document.

Figure 8:
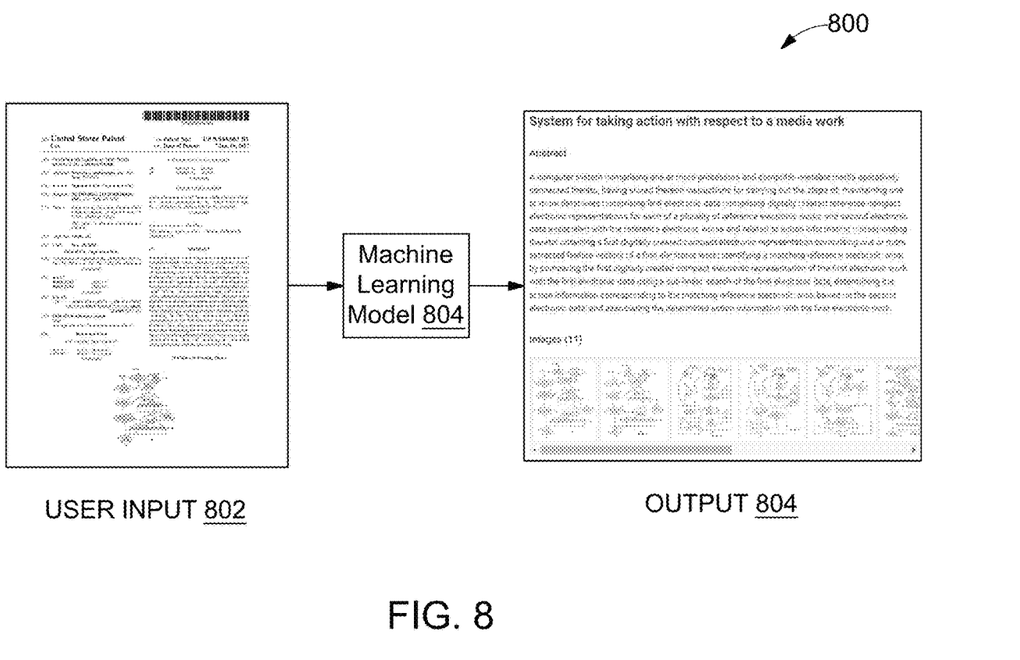
FIG. 8 illustrates identification of a problem statement from a patent document by a machine learning model, in accordance with an exemplary embodiment.

Referring to FIG. 8, identification of a problem statement from a patent document by a machine learning model is illustrated, in accordance with an exemplary embodiment. Let us assume that a user wishes to identify a problem statement (i.e., the objective) addressed in a patent document (i.e., the document). To this end, the user may provide the patent document as a user input 802 to the machine learning model 804. Upon receiving the user input 802, the machine learning model 804, may extract a set of features from the user input 802. Further, the extracted set of features may be mapped with a first set of features. In reference to FIG. 1-FIG. 7, the first set of features may correspond to the first set of features used to train the machine learning model. In addition, the machine learning model described in above FIGS., i.e., FIG. 1-FIG. 7, may correspond to the machine leaning model 804. Based on the mapping of the extracted set of features with the first set of features, the machine learning model 804 may provide an output 806. The output 806 may represent the problem statement addressed in the patent document as depicted via present FIG. 8.

Figure 9:
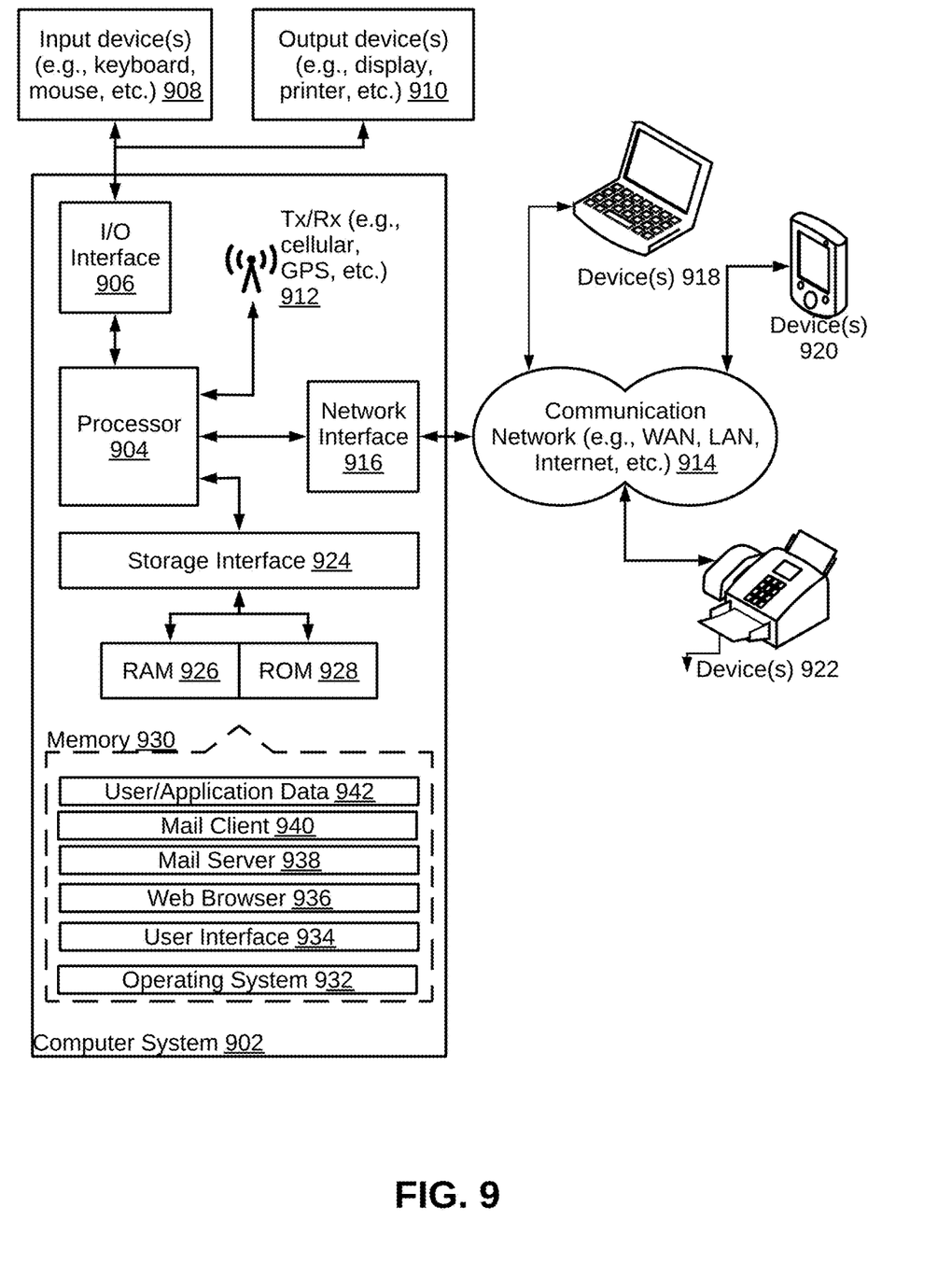
FIG. 9 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 902 for implementing various embodiments is illustrated. Computer system 902 may include a central processing unit ("CPU" or "processor") 904. Processor 904 may include at least one data processor for executing program components for executing user or system-generated requests. A user may include a person, a person using a device such as such as those included in this disclosure, or such a device itself. Processor 904 may include specialized processing units such as integrated system (bus) controllers, memory management control units, floating point units, graphics processing units, digital signal processing units, etc. Processor 904 may include a microprocessor, such as AMD® ATHLOM® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 904 may be disposed in communication with one or more input/output (I/O) devices via an I/O interface 906. I/O interface 906 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 906, computer system 902 may communicate with one or more I/O devices. For example, an input device 908 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 910 may be a printer, fax machine, video display (for example, cathode ray tube (CRT), liquid crystal display (LCD), light-emitting diode (LED), plasma, or the like), audio speaker, etc. In some embodiments, a transceiver 912 may be disposed in connection with processor 904. Transceiver 912 may facilitate various types of wireless transmission or reception. For example, transceiver 912 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 904 may be disposed in communication with a communication network 914 via a network interface 916. Network interface 916 may communicate with communication network 914. Network interface 916 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 914 may include, without limitation, a direct interconnection, local area network (LAN), wide area network (WAN), wireless network (for example, using Wireless Application Protocol), the Internet, etc. Using network interface 916 and communication network 914, computer system 902 may communicate with devices 918, 920, and 922. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 902 may itself embody one or more of these devices.

In some embodiments, processor 904 may be disposed in communication with one or more memory devices (for example, RAM 926, ROM 928, etc.) via a storage interface 924. Storage interface 924 may connect to memory 930 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 930 may store a collection of program or database components, including, without limitation, an operating system 932, User interface 934, web browser 936, mail server 938, mail client 940, user/application data 942 (for example, any data variables or data records discussed in this disclosure), etc. Operating system 932 may facilitate resource management and operation of computer system 902. Examples of operating systems 932 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 934 may facilitate display, execution, interaction, manipulation, or operation of program components through textual or graphical facilities. For example, user interfaces may provide computer interaction interface elements on a display system operatively connected to computer system 902, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 902 may implement a web browser 936 stored program component. Web browser 936 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 902 may implement a mail server 938 stored program component. Mail server 938 may be an Internet mail server such as MICROSOFT® EXCHANGE® mail server, or the like. Mail server 938 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 938 may utilize communication protocols such as internet message access protocol (IMAP), messaging application programming interface (MAPI), Microsoft Exchange, post office protocol (POP), simple mail transfer protocol (SMTP), or the like. In some embodiments, computer system 902 may implement a mail client 940 stored program component. Mail client 940 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 902 may store user/application data 942, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for identifying an objective from documents. The method and system may determine a correlation of each of a plurality of keywords extracted from a set of documents with respect to each class within a set of predefined classes. The method and system may determine a first set of keywords from the plurality of keywords. The correlation for each of the first set of keywords is below a predefined correlation threshold. Further, the method and system may identify a set of data samples comprising a first plurality of sentences oriented towards a set of objectives and a second plurality of sentences disaffiliated from the set of objectives. Moreover, the method and system may compute a statistical significance value of each keyword in the first set of keywords with respect to the first plurality of sentences. In addition, the method and system may generate a first set of features by discarding at least one keyword from the first set of keywords. The statistical significance value for each of the at least one keyword is above a predefined statistical threshold. Thereafter, the method and system may train a machine learning model to identify an objective of a document, based on the first set of features and the first plurality of sentences.

The benefit of the invention is that the present invention may provide efficient and accurate identification of an objective of documents. The present invention may help in avoiding need of manual feature selection for classification, thereby saving time and efforts required. Moreover, the present invention may avoid need of training large machine learning models to identify objective of the documents. The amount of training data needed is also greatly minimized and the resulting machine learning model, being much smaller in size, uses lower computation resources, runs faster, and thus can be used to process very large document collections (say hundreds of millions of documents) in a short time period. In addition, the present invention may enable easy identification of the objective of the documents with high accuracy via usage of small vocabulary, irrespective of technology or terminology present in the documents.

The specification has described method and system for identifying the objective from the documents. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of identifying an objective from documents, the method comprising:
    determining a correlation of each of a plurality of keywords extracted from a set of documents with respect to each class within a set of predefined classes;
    determining a first set of keywords from the plurality of keywords, wherein the correlation for each of the first set of keywords is below a predefined correlation threshold;
    identifying a set of data samples comprising a first plurality of sentences oriented towards a set of objectives and a second plurality of sentences disaffiliated from the set of objectives;
    computing a statistical significance value of each keyword in the first set of keywords with respect to the first plurality of sentences;
    generating a first set of features by discarding at least one keyword from the first set of keywords, wherein the statistical significance value for each of the at least one keyword is above a predefined statistical threshold; and
    training a machine learning model to identify an objective of a document, based on the first set of features and the first plurality of sentences.

2. The method of claim 1, wherein determining the correlation of a keyword from the plurality of keywords comprises computing a correlation variance for the keyword with respect to each class within the set of predefined classes.

3. The method of claim 1, further comprises discarding a second set of keywords from the plurality of keywords, wherein for each keyword in the second set of keywords, an associated correlation is above the predefined correlation threshold.

4. The method of claim 1, further comprising extracting a subset of keywords from the first plurality of sentences based on the first set of keywords, wherein the subset of keywords is a subset of the first set of keywords.

5. The method of claim 4, wherein the statistical significance value is computed for each keyword in the subset of keywords with respect to the set of objectives, and wherein the first set of features is generated by discarding at least one keyword from the subset of keywords, wherein the statistical significance value for each of the at least one keyword is above the predefined statistical threshold.

6. The method of claim 1, wherein the statistical significance value of a keyword in the first set of keywords with respect to the set of objectives is a p-value.

7. The method of claim 1, further comprising identifying the statistical significance value of each keyword in the first set of keywords with respect to the second plurality of sentences.

8. The method of claim 7, further comprising discarding at least one keyword from the first set of keywords, wherein the statistical significance value for each of the at least one keyword is below the predefined statistical threshold.

9. The method of claim 1, wherein identifying the objective from the document corresponds to a method of identifying a problem statement disclosed in a patent document.

10. The method of claim 1, wherein training the machine learning model comprising:
    initializing the set of data samples comprising, the first plurality of sentences and the second plurality of sentences;
    identifying the first set of features based on the first plurality of sentences and the second plurality of sentences;
    generating a function for mapping the set of data samples with the first set of features; and
    adjusting associated weights to get desired level of accuracy, wherein the associated weights are generated based on the set of data samples and the first set of features.

11. A system for identifying an objective from documents, the system comprising:
    a processor; and
    a memory communicatively coupled to the processor, wherein the memory stores processor instructions, which, on execution, causes the processor to:
        determine a correlation of each of a plurality of keywords extracted from a set of documents with respect to each class within a set of predefined classes;
        determine a first set of keywords from the plurality of keywords, wherein the correlation for each of the first set of keywords is below a predefined correlation threshold;
        identify a set of data samples comprising a first plurality of sentences oriented towards a set of objectives and a second plurality of sentences disaffiliated from the set of objectives;
        compute a statistical significance value of each keyword in the first set of keywords with respect to the first plurality of sentences;
        generate a first set of features by discarding at least one keyword from the first set of keywords, wherein the statistical significance value for each of the at least one keyword is above a predefined statistical threshold; and train a machine learning model to identify an objective of a document, based on the first set of features and the first plurality of sentences.

12. The system of claim 11, wherein the processor instructions further cause the processor to determine the correlation of a keyword from the plurality of keywords by computing a correlation variance for the keyword with respect to each class within the set of predefined classes.

13. The system of claim 11, wherein the processor instruction further causes the processor to discard a second set of keywords from the plurality of keywords, wherein for each keyword in the second set of keywords, an associated correlation is above the predefined correlation threshold.

14. The system of claim 11, wherein the processor instruction further causes the processor to extract a subset of keywords from the first plurality of sentences based on the first set of keywords, wherein the subset of keywords is a subset of the first set of keywords.

15. The system of claim 14, wherein:
the statistical significance value is computed for each keyword in the subset of keywords with respect to the set of objectives;
the first set of features is generated by discarding at least one keyword from the subset of keywords;
the statistical significance value for each of the at least one keyword is above the predefined statistical threshold; and
the statistical significance value of a keyword in the first set of keywords with respect to the set of objectives is a p-value.

16. The system of claim 11, wherein the processor instructions further cause the processor to identify the statistical significance value of each keyword in the first set of keywords with respect to the second plurality of sentences.

17. The system of claim 16, wherein the processor instructions further cause the processor to discard at least one keyword from the first set of keywords, and wherein the statistical significance for each of the at least one keyword is below the predefined statistical threshold.

18. The system of claim 11, wherein the processor instructions further cause the processor to train the machine learning model by:
initializing the set of data samples comprising, the first plurality of sentences and the second plurality of sentences;
identifying the first set of features based on the first plurality of sentences and the second plurality of sentences;
generating a function for mapping the set of data samples with the first set of features; and
adjusting associated weights to get desired level of accuracy, wherein the associated weights are generated based on the set of data samples and the first set of features.

19. A non-transitory computer-readable storage medium having stored thereon, a set of computer-executable instructions causing a computer comprising one or more processors to perform steps comprising:
determining a correlation of each of a plurality of keywords extracted from a set of documents with respect to each class within a set of predefined classes;
determining a first set of keywords from the plurality of keywords, wherein the correlation for each of the first set of keywords is below a predefined correlation threshold;
identifying a set of data samples comprising a first plurality of sentences oriented towards a set of objective and a second plurality of sentences disaffiliated from the set of objectives;
computing a statistical significance value of each keyword in the first set of keywords with respect to the first plurality of sentences;
generating a first set of features by discarding at least one keyword from the first set of keywords, wherein the statistical significance value for each of the at least one keyword is above a predefined statistical threshold; and
training a machine learning model to identify an objective of a document, based on the first set of features and the first plurality of sentences.

* * * * *